(12) United States Patent
Clute et al.

(10) Patent No.: US 7,273,191 B2
(45) Date of Patent: Sep. 25, 2007

(54) LOW PROFILE SPLINE

(75) Inventors: Gunter Clute, Bloomfield Hills, MI (US); Gerald Keller, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 356 days.

(21) Appl. No.: 11/008,308

(22) Filed: Dec. 9, 2004

(65) Prior Publication Data
US 2006/0124794 A1   Jun. 15, 2006

(51) Int. Cl.
*B65H 75/48* (2006.01)
(52) U.S. Cl. .................. 242/379.1; 280/805; 297/470
(58) Field of Classification Search ............. 242/379.1; 280/805; 297/470
See application file for complete search history.

(56) References Cited

U.S. PATENT DOCUMENTS

| | | | |
|---|---|---|---|
| 5,522,564 A | 6/1996 | Schmidt et al. | |
| 5,547,143 A | 8/1996 | Miller, III et al. | |
| 5,799,893 A * | 9/1998 | Miller et al. | 242/379.1 |
| 5,820,058 A | 10/1998 | Hirzel et al. | |
| 5,938,135 A | 8/1999 | Sasaki et al. | |
| 6,012,667 A | 1/2000 | Clancy, III et al. | |
| 6,105,893 A | 8/2000 | Schmidt et al. | |
| 6,105,894 A | 8/2000 | Singer et al. | |
| 6,241,172 B1 | 6/2001 | Fugel et al. | |
| 6,267,314 B1 | 7/2001 | Singer et al. | |
| 6,364,238 B1 | 4/2002 | Weller | |
| 6,416,007 B1 * | 7/2002 | Stegmeier | 242/379.1 |
| 6,616,081 B1 | 9/2003 | Clute et al. | |
| 6,729,649 B1 | 5/2004 | Schmidt | |
| 2006/0124793 A1 * | 6/2006 | Keller et al. | 242/382 |
| 2006/0124795 A1 * | 6/2006 | Clute | 242/382 |
| 2006/0131456 A1 * | 6/2006 | Romero | 242/382 |
| 2006/0273210 A1 * | 12/2006 | Clute et al. | 242/374 |

* cited by examiner

*Primary Examiner*—Gene O. Crawford
*Assistant Examiner*—Sang Kim
(74) *Attorney, Agent, or Firm*—Sally J Brown; Brinks Hofer Gilson & Lione

(57) ABSTRACT

A seatbelt retractor is disclosed. The seatbelt retractor includes a frame, a spindle, and a torsion member. The frame is attached to a structural member of a vehicle. The spindle is rotatably supported in the frame. The spindle includes a slot for accommodating a seatbelt webbing. The torsion member is coupled to the spindle, and the torsion member has a first engagement end, a second engagement end and an intermediate engagement portion disposed between the first and second engagement ends. The intermediate engagement portion includes an engagement portion and a non-engagement portion, wherein the engagement portion couples the torsion member to the spindle and the non-engagement portion is proximate the seatbelt webbing and allows seatbelt webbing to pass through the slot without interference.

18 Claims, 2 Drawing Sheets

LOW PROFILE SPLINE

TECHNICAL FIELD

The present invention relates to seatbelt retractors and restraint devices used typically in road vehicles for restraining an occupant's movement during a vehicle collision.

BACKGROUND

A seatbelt system is one type of safety system used in vehicles today to prevent or reduce vehicle occupant injury during a vehicle collision. Typically, the seatbelt system includes seatbelt webbing that is stored in a retractor when not in use and protracted from the retractor and secured around the vehicle occupant when in use. The retractor includes a spring for retracting the seatbelt webbing from the retractor. The webbing is wound around a spool or spindle. If the retractor is a load limiting retractor the spindle is coupled to a torsion bar. During normal use and when the vehicle is not involved in the vehicle collision, the spindle freely rotates when the webbing is retracted or protracted from the retractor. However, during a vehicle collision, the seatbelt webbing must be prevented from protracting from the retractor in order to restrain the vehicle occupant's movement toward the vehicle interior. A locking mechanism is provided in the retractor to prevent further protraction of the seatbelt webbing by preventing the one end of the torsion bar and spindle from rotating.

During a vehicle impact and when the spool and torsion bar are rotationally locked, it is desirable to "pay out" some portion of the seatbelt webbing to prevent peak loading on the vehicle occupant. Thus, the torsion bar provides the desired "pay out" feature by twisting a predetermined amount during vehicle impact allowing the seatbelt webbing to "payout." A further enhancement to seatbelt retractors is a torsion bar that allows multiple levels of load limiting. The multiple levels of load limiting are achieved through the use of a multi-segmented torsion bar. Current multi-segmented torsion bars are designed to prevent interference with the seatbelt webbing which is routed through the spool and past the torsion bar. This is achieved in conventional retractors by designing the segments between splines to be no shorter than the width of the seatbelt webbing. If the webbing does not pass over the spline, a supplemental sleeve or spacer may be used. Thus, the size and packaging of the seatbelt retractor are significantly constrained either by width of the seatbelt retractor or diameter of the spindle.

Therefore, a need exists for a new and improved seatbelt retractor that provides a multiple load-limiting feature and is able to be packaged in smaller retractors. Further, the seatbelt webbing of the new and improved retractor should not interfere with the multiple load-limiting torsion bar and be capable of installation through the retractor spindle with supplemental components.

SUMMARY

In an aspect of the present invention a seatbelt retractor is provided. The seatbelt retractor includes a frame, a spindle, and a torsion member. The frame is attached to a structural member of a vehicle. The spindle is rotatably supported in the frame. The spindle includes a slot for accommodating a seatbelt webbing. The torsion member is coupled to the spindle, and the torsion member has a first engagement end, a second engagement end and an intermediate engagement portion disposed between the first and second engagement ends. The intermediate engagement portion includes an engagement portion and a non-engagement portion, wherein the engagement portion couples the torsion member to the spindle and the non-engagement portion is proximate the seatbelt webbing and allows seatbelt webbing to pass through the slot without interference.

In another aspect of the present invention the seatbelt retractor has a first end assembly for engaging the first engagement end.

In still another aspect of the present invention the seatbelt retractor has a second end assembly for engaging the second engagement end.

In still another aspect of the present invention the intermediate engagement portion is a low profile spline.

In yet another aspect of the present invention the intermediate engagement portion includes a spline portion and a non-spline portion.

In yet another aspect of the present invention the intermediate portion includes a poke yoke feature to prevent misasembly of the torsion bar into the retractor spindle.

In yet another aspect of the present invention the torsion member is a torsion bar.

In yet another aspect of the present invention the torsion bar has a first bar portion extending between the first engagement end and the intermediate engagement portion and a second bar portion extending between the second engagement end and the intermediate engagement portion.

In still another aspect of the present invention the first bar portion has a first bar diameter that is larger than the diameter of the second bar portion.

In yet another aspect of the present invention a seatbelt retractor is provided. The seatbelt retractor has a frame, a spindle and an energy absorption means. The frame is attached to a structural member of a vehicle. The spindle is rotatably supported in the frame. The spindle includes a slot for accommodating a seatbelt webbing. The energy absorption means is coupled to the spindle. The energy absorption means has a first engagement end, a second engagement end and an intermediate engagement portion disposed between the first and second engagement ends. The intermediate engagement portion includes an engagement portion and a non-engagement portion, wherein the engagement portion couples the energy absorption means to the spindle and the non-engagement portion is proximate the seatbelt webbing and allows seatbelt webbing to pass through the slot without interference.

These and other aspects and advantages of the present invention will become apparent upon reading the following detailed description of the invention in combination with the accompanying drawings.

DESCRIPTION

Figure 1:
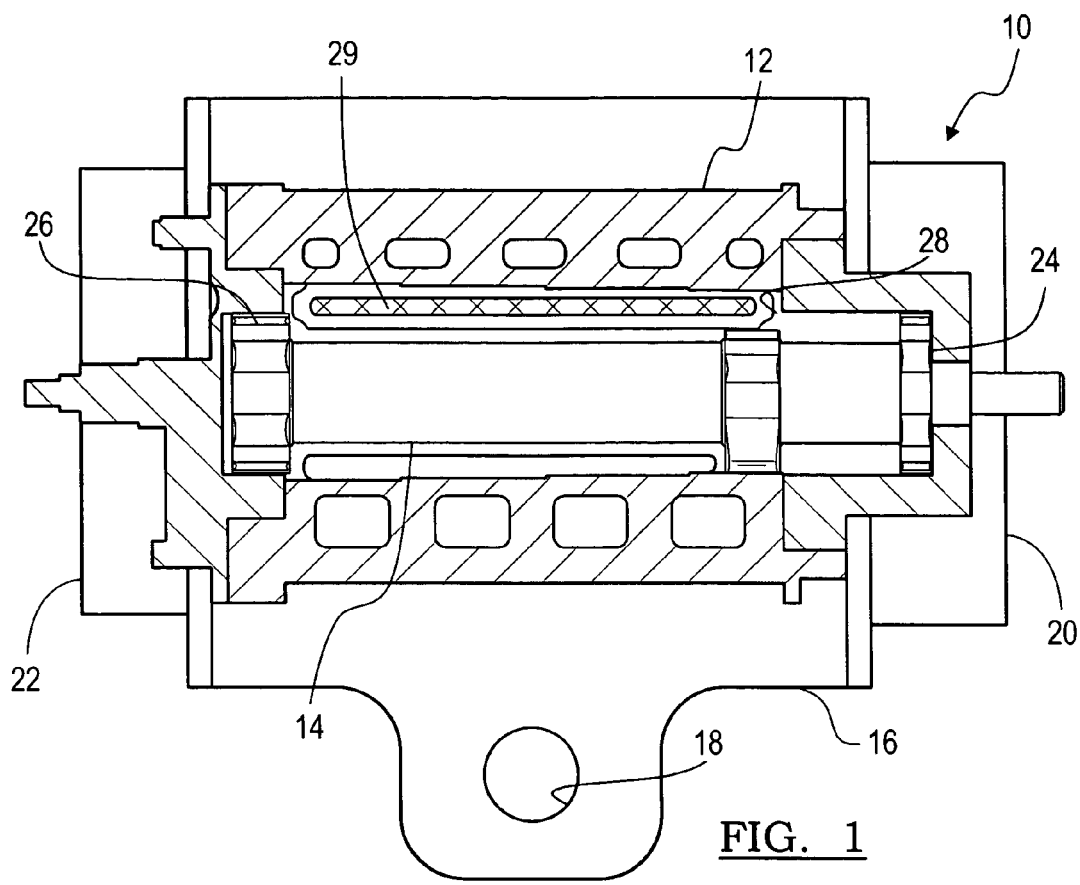
FIG. 1 is a front perspective view of a seatbelt retractor having a multi-segmented torsion bar for providing multi-level load limiting, in accordance with an embodiment of the present invention.

Referring now to FIG. 1, a perspective view of a seatbelt retractor 10 embodying the present invention is illustrated. Retractor 10 includes a spindle 12 coupled to a torsion bar 14 that is supported in a frame 16 for rotational movement therein. Frame 16 includes at least one attachment aperture 18 for securing retractor 10 to a structural member (not shown) of a vehicle. Frame 18 is generally U-shaped and includes apertures (not shown) for receiving torsion bar 14.

Further, retractor 10 includes end assemblies 20 and 22. End assemblies 20 and 22 include locking mechanisms that engage a first and second engagement end 24 and 26 of torsion bar 14 selectively during a vehicle collision, as well known in the art. For example, end assemblies 20, 22 are of the type disclosed in U.S. Pat. Nos. 6,616,081; 6,012,667; and 5,924,641, hereby incorporated by reference.

Spindle 12 is rotationally fixed to torsion bar 14 for rotation therewith as will be described hereinafter. Spindle 12, as known in the art, includes a slot 28 for receiving seatbelt webbing 29. Upon rotation of spindle 12, urged by a retraction spring (not shown), seatbelt webbing 29 is wound about the spindle and retracted into retractor 10, as well known in the art. During use seatbelt webbing 29 is protracted from retractor 10 and webbing 29 unwinds from spindle 12 and is placed over a vehicle occupant and secured to a seatbelt buckle (not shown).

Figure 2:
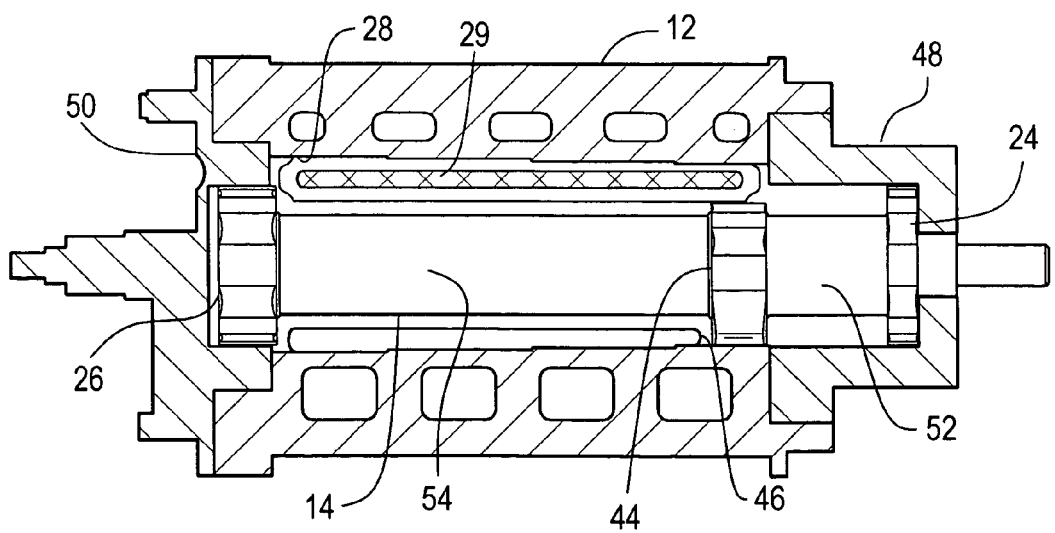
FIG. 2 is a perspective view of a spindle and torsion bar, in accordance with an embodiment of the present invention.

Referring now to FIG. 2, spindle 12 is shown in cross-section with torsion bar 14 and seatbelt webbing 29. First and second engagement ends 26 and 24 are disposed at opposite ends of torsion bar 14. Engagement ends 24 and 26 are generally in the form of gears or splines having a plurality of gear teeth, as are conventionally known in the art. The gear teeth of ends 24, 26 mate or mesh with cooperating apertures in tread heads 48 and 50. Spindle 12 and tread heads 48, 50 are configured to mate and allow spindle 12 to rotate relative to tread heads 48, 50 during a vehicle collision. More specifically, during a vehicle collision at least one of the tread heads will be engaged and locked rotationally relative to spindle 12 by one of the end assemblies 20, 22. An intermediate engagement portion 44 is provided and is positioned between first and second engagement ends 26, 24. Intermediate engagement portion 44 mates with and engages a spindle engagement portion 46 to rotationally fix and couple spindle 12 to torsion bar 14.

The portion 54 of torsion bar 14 between first engagement end 26 and intermediate engagement portion 44 defines a first torsion bar and the portion 52 of torsion bar 14 between second engagement end 24 and intermediate engagement portion 44 defines a second torsion bar. Upon locking and rotational fixing of tread head 50 spindle 12 will rotate and twist portion 54 of torsion bar 14 to "payout" the seatbelt webbing. Similarly, upon locking and rotational fixing of end cap 50, spindle 12 will rotate and twist portion 52 of torsion bar 14 to "payout" the seatbelt webbing independently, or in conjunction with twist portion 54.

Portions 52 and 54 of torsion bar 14 may have different lengths and cross-sectional geometry to provide multiple load limiting levels for different sized vehicle occupants and different crash severities. For example, portion 54 may be configured to be more compliant relative to portion 52 to allow for more seatbelt webbing payout during a vehicle collision when a smaller occupant is present or the severity of the vehicle crash is low. On the contrary, portion 52 may be configured to be less compliant relative to portion 54 to allow for less seatbelt webbing payout during a vehicle collision when a larger occupant is present or the severity of the vehicle crash is high.

Figure 3A:
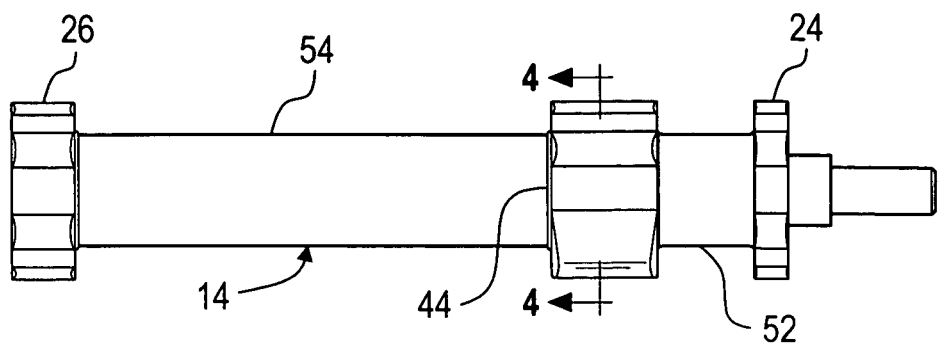
FIGS. 3a and 3b are a perspective views of a multi-segmented torsion bar, in accordance with an embodiment of the present invention.
Figure 4:
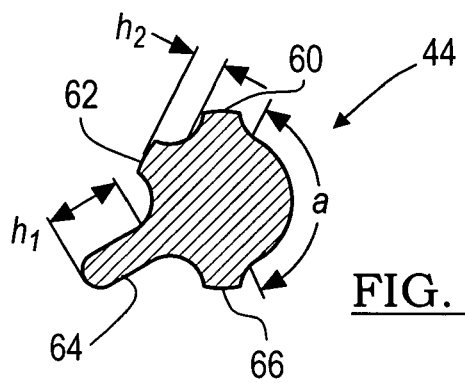
FIG. 4 is a cross-sectional view through an intermediate engagement portion of the multi-segmented torsion bar of FIG. 3a, in accordance with an embodiment of the present invention.
Figure 3B:
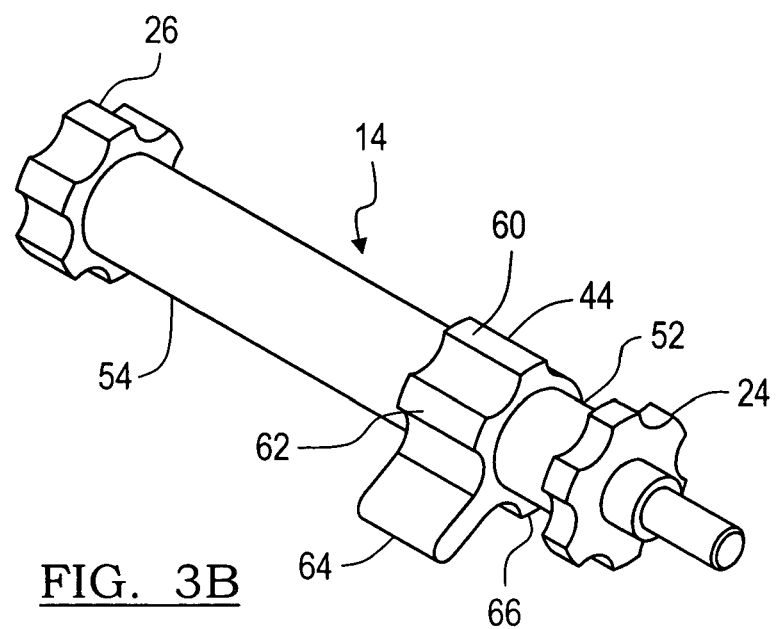

Referring now to FIGS. 3a, 3b and 4, a more detailed illustration of torsion bar 14 is provided, in accordance with an embodiment of the present invention. As illustrated, intermediate engagement portion 44 is positioned closer to second engagement end 24. However, the present invention contemplates locating intermediate engagement portion 44 at different positions along torsion bar 14 (i.e. centered between first an second engagement ends 26 and 24). Moreover, the present invention contemplates different geometries for portions 52, 54 of torsion bar 14 (i.e. portion 52 having a smaller diameter than portion 54 and vice versa, portions 52, 54 having rectangular cross-sections, square or triangular cross-sections, etc.). The spring arbor of the engagement end may or may not be integral to the torsion bar.

Intermediate engagement portion 44 is fixedly attached to torsion bar 14 and may be integrally formed therein or pressed thereon. Further, intermediate engagement portion 44 includes teeth 60, 62, 64, and 66 for positive and cooperative engagement with spindle 12. More specifically, teeth 60-66 mesh with teeth (not shown) in spindle 12 to prevent relative rotation between intermediate engagement portion 44 and torsion bar 14.

In an embodiment of the present invention a poke yoke feature is provided by the geometry of one or more of the teeth, e.g. 62. One embodiment may have tooth 64 having a larger height (h1) relative to the height (h2) of the other teeth, 60, 62 and 66. Accordingly, the cooperating (meshed) teeth in spindle 12 will have a corresponding difference in height. In other words, tooth 64 will fit within a deeper groove disposed in spindle 12 relative to the grooves that accommodate teeth 60, 62 and 66. In this manner, tooth 64 provides a poke yoke feature that prevents misalignment of torsion bar 14 relative to spindle 12. An alternate embodiment may have an irregular spacing of the teeth 62 to create a unique pattern to prohibit misassembly. The alignment of torsion bar 12 with respect to spindle 14 is necessary to ensure that intermediate engagement portion 44 does not interfere with seatbelt webbing 29 disposed in slot 28, as will be described further below.

With continuing reference to FIG. 4, a cross-sectional view through intermediate engagement portion 44 is illustrated, in accordance with an embodiment of the present invention. Intermediate engagement portion 44, as previously stated and illustrated, has a plurality of teeth 60, 62, 64 and 66. Additionally, intermediate engagement portion 44 has an area (a) a "non-engagement portion" between, for example, teeth 60 and 66 where there are no teeth or protrusions from the intermediate engagement portion. This area (a) allows the seatbelt webbing to pass through slot 28 without interfering with the torsion bar 14. The present invention, of course, contemplates other configurations of torsion bar 14 and area (a) between teeth 60 and 66 that allow seatbelt webbing 29 to pass through slot 28 without interference. For example, area (a) could be flat between teeth 60 and 66.

The present invention has many advantages and benefits over the prior art. For example, the present invention provides a smaller retractor package as compared to conventional multi-level load limiting retractors that must accommodate an intermediate engagement portion. Further, the present invention provides a poke yoke feature to prevent misalignment of the torsion bar with the spindle during assembly of the retractor.

As any person skilled in the art of seatbelt retractors will recognize from the previous detailed description and from the figures and claims, modifications and changes can be made to the preferred embodiments of the invention without departing from the scope of this invention defined in the following claims.

The invention claimed is:

1. A seatbelt retractor comprising:
a frame attached to a structural member of a vehicle;
a spindle rotatably supported in the frame wherein the spindle includes a slot for accommodating a seatbelt webbing;
a torsion member coupled to the spindle, wherein the torsion member has a first engagement end, a second engagement end and an intermediate engagement portion disposed between the first and second engagement ends, and wherein the intermediate engagement portion includes an engagement portion and a non-engagement portion, wherein the engagement portion couples the torsion member to the spindle and the non-engagement portion is proximate the seatbelt webbing and allows seatbelt webbing to pass through the slot without interference; and
the intermediate engagement portion fixedly attached to the spindle, the first and second engagement ends being rotatable relative to the spindle.

2. The seatbelt retractor of claim 1 further comprising a first end assembly for selectively engaging the first engagement end.

3. The seatbelt retractor of claim 1 further comprising a second end assembly for selectively engaging the second engagement end.

4. The seatbelt retractor of claim 1 wherein the engagement portion includes a spline having teeth and wherein the non-engagement portion has no teeth.

5. The seatbelt retractor of claim 1 wherein the intermediate engagement portion is a spline having a shape configured to allow the webbing to pass over the spline without blocking the installation of the webbing.

6. The seatbelt retractor of claim 1 wherein the intemiediate engagement portion includes a spline portion and a non-spline portion.

7. The seatbelt retractor of claim 1 wherein the intermediate engagement portion includes a poke yoke having at least one tooth sized larger than the teeth surrounding the at least one tooth.

8. The seatbelt retractor of claim 1 wherein the torsion member is a torsion bar.

9. The seatbelt retractor of claim 8 wherein the torsion bar has a first bar portion extending between the first engagement end and the intermediate engagement portion and a second bar portion extending between the second engagement end and the intermediate engagement portion.

10. The seatbelt retractor or claim 9 wherein the first bar portion has a first bar diameter that is larger than the diameter of the second bar portion.

11. A seatbelt refractor comprising:
a frame attached to a structural member of a vehicle;
a spindle rotatably supported in the frame wherein the spindle includes a slot for accommodating a seatbelt webbing;
an energy absorption means coupled to the spindle, wherein the energy absorption means has a first engagement end, a second engagement end and an intermediate engagement portion disposed between the first and second engagement ends, and wherein the intermediate engagement portion includes an engagement portion and a non-engagement portion, wherein the engagement portion couples the energy absorption means to the spindle and the non-engagement portion is proximate the seatbelt webbing and allows seatbelt webbing to pass through the slot without interferencez; and
the intermediate engagement portion including a poke yoke having at least one tooth sized larger than the teeth surrounding the at least one tooth.

12. The seatbelt retractor of claim 11 further comprising a first end assembly for engaging the first engagement end.

13. The seatbelt retractor of claim 11 further comprising a second end assembly for engaging the second engagement end.

14. The seatbelt retractor of claim 11 wherein the intermediate engagement portion includes a spline having teeth and wherein the non-engagement portion has no teeth.

15. The seatbelt retractor of claim 11 wherein the intermediate engagement portion includes a spline portion and a non-spline portion.

16. The seatbelt retractor of claim 11 wherein the energy absorption means is a torsion bar.

17. The seatbelt retractor of claim 16 wherein the torsion bar has a first bar portion extending between the first engagement end and the intermediate engagement portion and a second bar portion extending between the second engagement end and the intermediate engagement portion.

18. The seatbelt retractor of claim 17 wherein the first bar portion has a first bar diameter that is larger than the diameter of the second bar portion.

* * * * *